United States Patent
Kao

(10) Patent No.: US 6,178,876 B1
(45) Date of Patent: Jan. 30, 2001

(54) PRESSURE COOKER

(76) Inventor: Yan-Tzong Kao, 9, Lane 37, Sec. 2, An Chung Rd., Tainan City (TW)

( * ) Notice: Under 35 U.S.C. 154(b), the term of this patent shall be extended for 0 days.

(21) Appl. No.: 09/614,520

(22) Filed: Jul. 12, 2000

(51) Int. Cl.[7] .............................. A23L 1/00; A47J 27/00; A47J 27/06; A47J 37/00; H05B 1/02
(52) U.S. Cl. ............................ 99/332; 99/331; 99/337; 99/403; 219/492; 219/497; 219/453; 219/506; 220/314; 220/316; 220/912
(58) Field of Search ..................... 99/325–333, 337, 99/338, 403–410, 444–450, 483; 126/369, 39 G, 39 R; 219/492, 494, 497, 453, 506, 452, 448, 501; 220/592, 246, 315, 393, 486, 489, 314, 316, 912; 324/663, 686; 426/510, 523, 231, 233

(56) References Cited

U.S. PATENT DOCUMENTS

| | | | |
|---|---|---|---|
| 3,806,701 | * | 4/1974 | Scott ................................. 219/438 |
| 3,908,111 | * | 9/1975 | Du Bois et al. ................. 219/442 |
| 4,005,645 | * | 2/1977 | Janssen ............................. 99/403 |
| 4,039,777 | * | 8/1977 | Baker ................................ 219/442 |
| 4,298,789 | * | 11/1981 | Eichelberger et al. ........ 219/521 X |
| 4,307,287 | * | 12/1981 | Weiss ........................... 219/432 X |
| 4,932,527 | * | 6/1990 | Hayes ................................ 99/331 |
| 5,348,187 | * | 9/1994 | Schultz ........................ 126/373 X |
| 5,355,777 | * | 10/1994 | Chen et al. .................... 99/410 X |
| 5,400,700 | * | 3/1995 | Bois ................................... 99/403 |
| 5,520,103 | * | 5/1996 | Zielinski et al. ............. 126/246 X |
| 5,673,611 | * | 10/1997 | Tieman ......................... 99/415 X |

* cited by examiner

Primary Examiner—Timothy F. Simone
(74) Attorney, Agent, or Firm—Alan Kamrath

(57) ABSTRACT

A pressure cooker has a hollow main body, a cover disposed on a top portion of the hollow main body, an upper joint disposed on the cover, a handle connected to the upper joint, and a heating device disposed on a bottom of the hollow main body. The heating device has a bottom casing, an upper casing engaging with the bottom casing, a thermal conducting plate disposed on the upper casing, and a thermal generating device disposed between the thermal conducting plate and the bottom casing. An electric circuit board is disposed in the bottom casing. An electric control board is disposed on the upper casing.

2 Claims, 6 Drawing Sheets

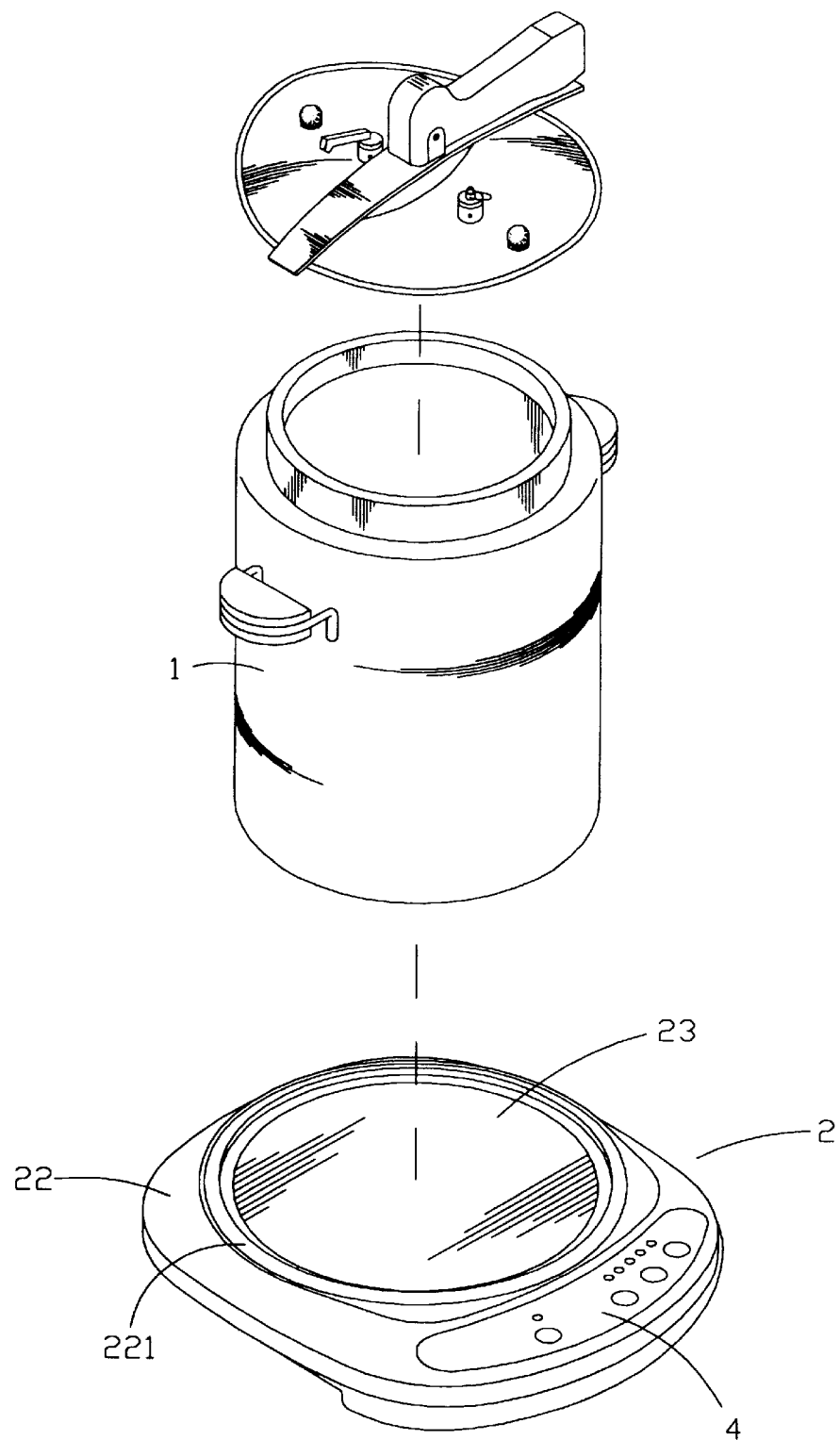
F I G. 1

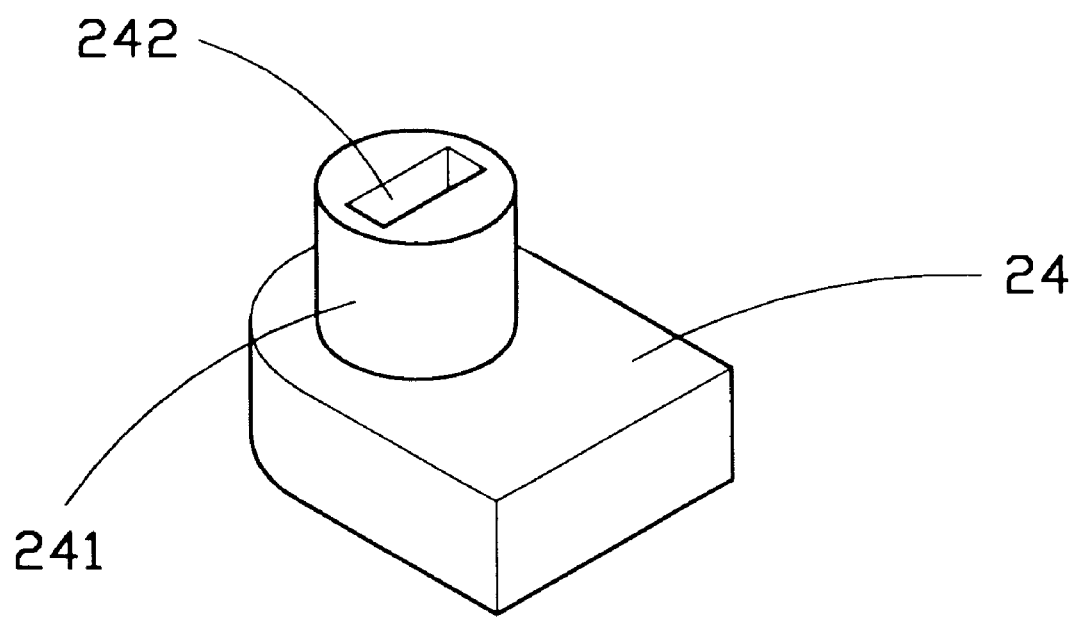
F I G. 3A

PRESSURE COOKER

BACKGROUND OF THE INVENTION

The present invention relates to a pressure cooker. More particularly, the present invention relates to a pressure cooker which has a heating device.

A conventional pressure cooker has a main body, a cover disposed on a top portion of the main body, and an exhaust steam valve disposed on the cover. When beans or powders of food are cooked, the exhaust steam valve will be choked easily. Therefore, an inner pressure of the conventional pressure cooker will be increased so that the conventional pressure cooker may be exploded.

SUMMARY OF THE INVENTION

An object of the present invention is to provide a pressure cooker which has a heating device can be detached from a main body of the pressure cooker in order to heat various types of cookers.

Accordingly, a heating device comprises a bottom casing, an upper casing engaging with the bottom casing, a thermal conducting plate disposed on the upper casing, and a thermal generating device disposed between the thermal conducting plate and the bottom casing. A plurality of sockets are disposed on the bottom casing. A plurality of pedestals are inserted in the sockets. Each of the pedestals has an upper pillar and an oblong hole formed in the upper pillar. A plurality of elastic elements each encloses the respective upper pillar. A flat insulation plate is disposed on the elastic elements. The flat insulation plate has a plurality of through holes each matching the respective oblong hole of the upper pillar. The thermal generating device has a dish disposed on the flat insulation plate, a corrugated insulation plate disposed on the dish, and a plurality of heaters disposed on a bottom of the thermal conducting plate. A plurality of bottom posts are disposed on a bottom of the dish. Each of the bottom posts is inserted through the respective through hole of the flat insulation plate and inserted in the respective oblong hole of the upper pillar. An electric circuit board is disposed in the bottom casing. An electric control board is disposed on the upper casing. A plurality of wires are connected to the electric circuit board and the heaters.

BRIEF DESCRIPTION OF THE DRAWINGS

FIG. 1 is a perspective exploded view of a pressure cooker of a preferred embodiment in accordance with the present invention;

FIG. 3A is a perspective view of an elastic pedestal of a preferred embodiment in accordance with the present invention;

DETAILED DESCRIPTION OF THE INVENTION

Figure 2:
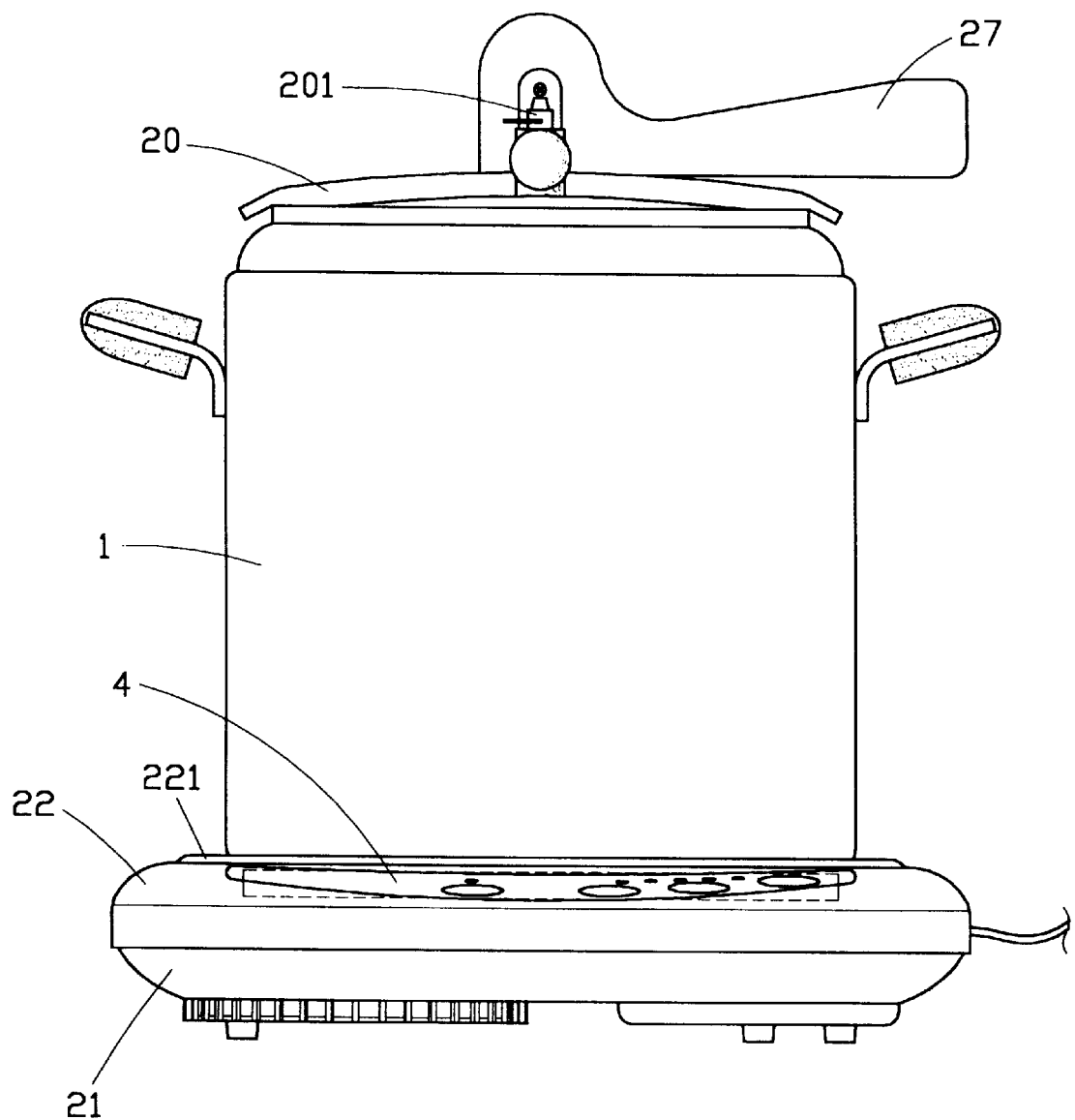
FIG. 2 is an elevational assembly view of a pressure cooker of a preferred embodiment in accordance with the present invention.
Figure 3:
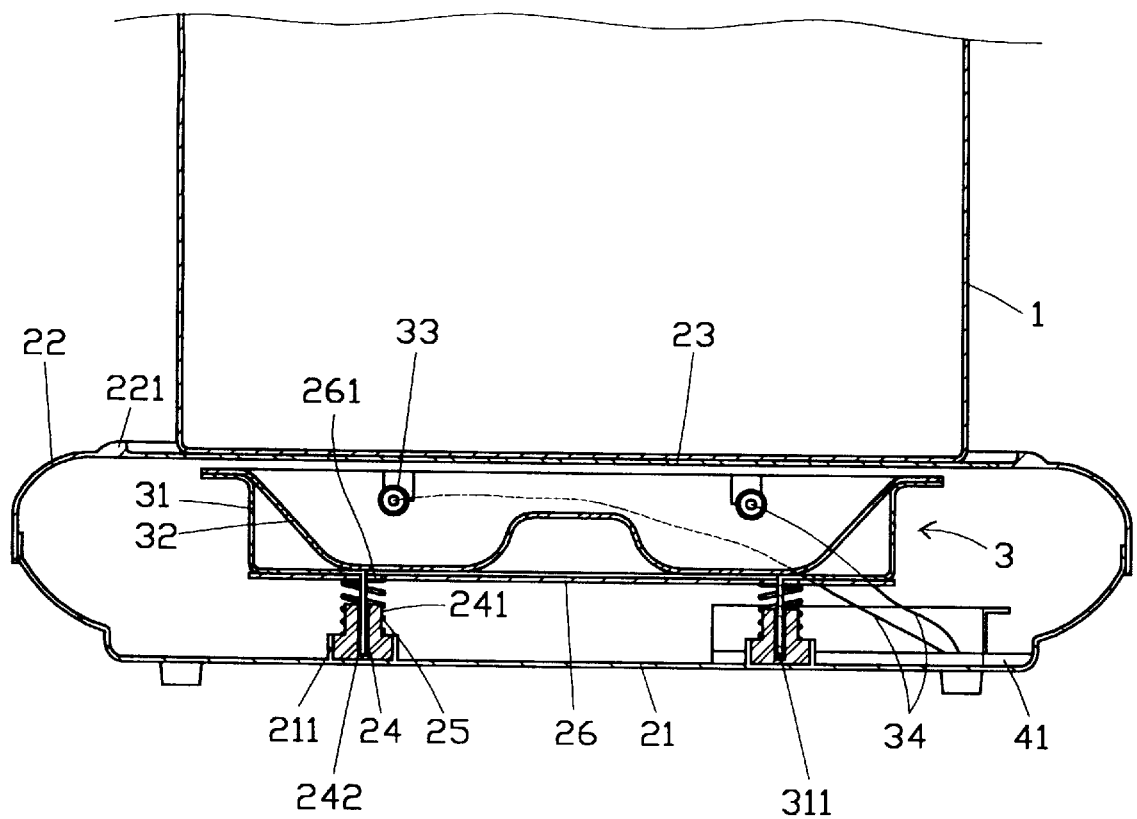
FIG. 3 is a partially sectional assembly view of a pressure cooker of a preferred embodiment in accordance with the present invention.
Figure 4:
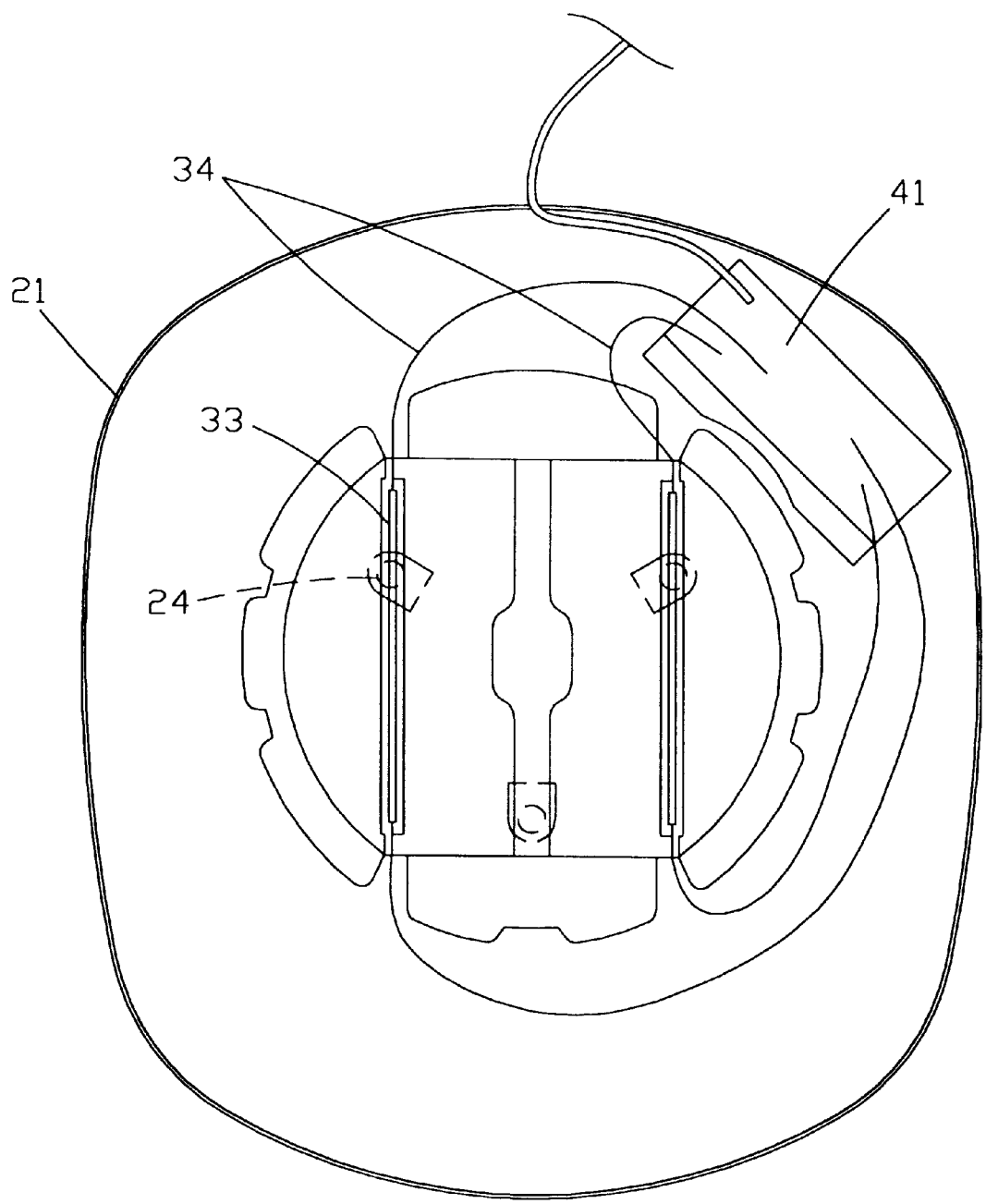
FIG. 4 is a top plan view of a heating device without an upper disk.

Referring to FIGS. 1 to 4 first, a pressure cooker comprises a hollow main body 1, a cover 20 disposed on a top portion of the hollow main body 1, an upper joint 201 disposed on the cover 20, a handle 27 connected to the upper joint 201, and a heating device 2 disposed on a bottom of the hollow main body 1.

The heating device 2 has a bottom casing 21, an upper casing 22 engaging with the bottom casing 21, a thermal conducting plate 23 disposed on the upper casing 22, and a thermal generating device 3 disposed between the thermal conducting plate 23 and the bottom casing 21.

A plurality of sockets 211 are disposed on the bottom casing 21. A plurality of pedestals 24 are inserted in the sockets 211. Each of the pedestals 24 has an upper pillar 241 and an oblong hole 242 formed in the upper pillar 241.

A plurality of elastic elements 25 each encloses the respective upper pillar 241.

A flat insulation plate 26 is disposed on the elastic elements 25. The flat insulation plate 26 has a plurality of through holes 261 each matching the respective oblong hole 242 of the upper pillar 241.

The thermal generating device 3 has a dish 31 disposed on the flat insulation plate 26, a corrugated insulation plate 26 disposed on the dish 31, and a plurality of heaters 33 disposed on a bottom of the thermal conducting plate 23.

A plurality of bottom posts 311 are disposed on a bottom of the dish 31. Each of the bottom posts 311 is inserted through the respective through hole 261 of the flat insulation plate 26 and inserted in the respective oblong hole 242 of the upper pillar 241.

An electric circuit board 41 is disposed in the bottom casing 21. An electric control board 4 is disposed on the upper casing 22.

A plurality of wires 34 are connected to the electric circuit board 41 and the heaters 33.

The upper casing 22 has an annular flange 221 enclosing a bottom of the hollow main body 1.

Figure 5:
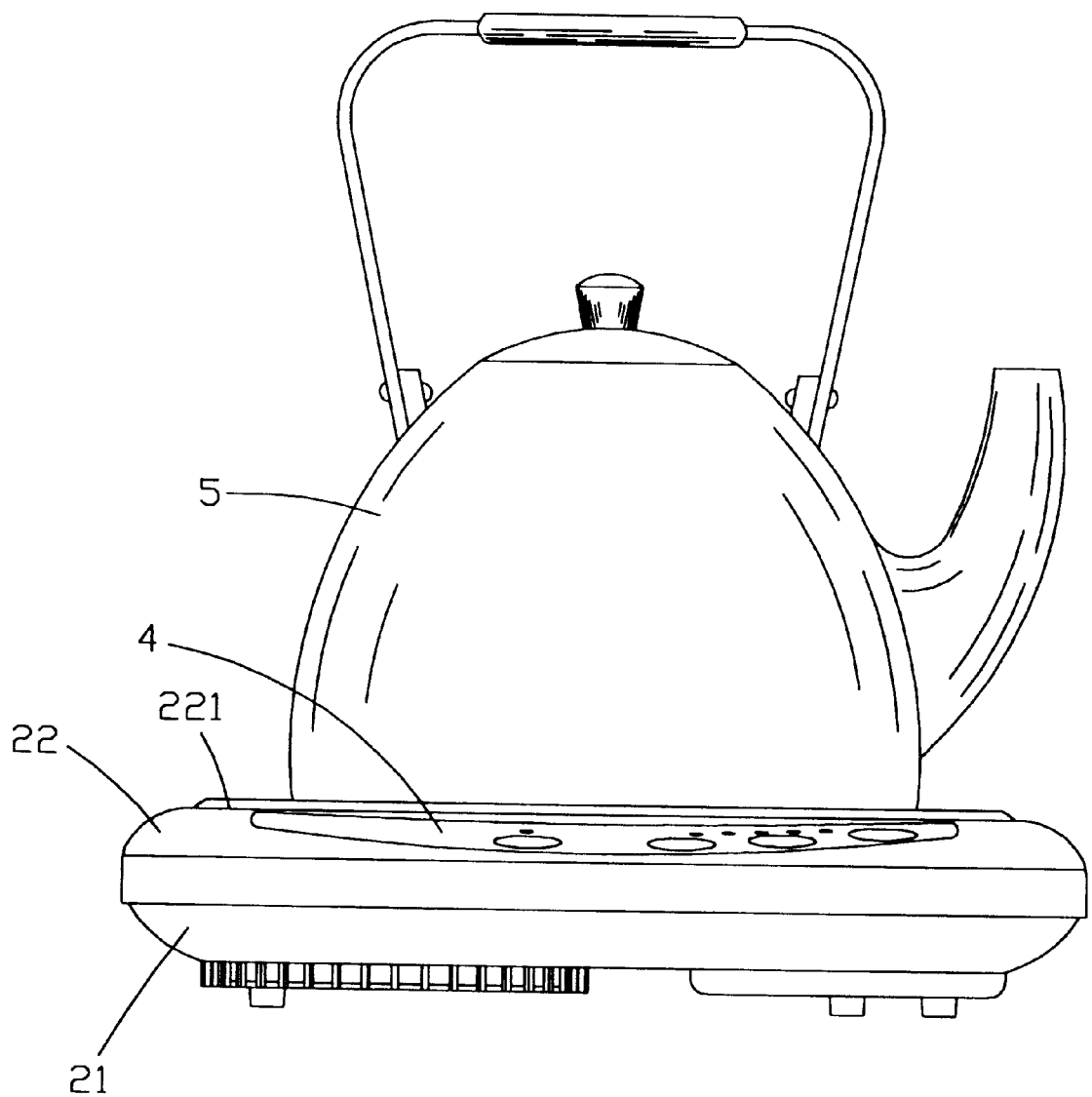
FIG. 5 is an elevational assembly view of a heating device and a teakettle.

Referring to FIG. 5, the annular flange 221 of the upper casing 22 enclosing a bottom of a teakettle 5.

The invention is not limited to the above embodiment but various modification thereof may be made. Further, various changes in form and detail may be made without departing from the scope of the invention.

I claim:

1. A pressure cooker comprises:
   a hollow main body, a cover disposed on a top portion of the hollow main body, an upper joint disposed on the cover, a handle connected to the upper joint, and a heating device disposed on a bottom of the hollow main body,
   the heating device having a bottom casing, an upper casing engaging with the bottom casing, a thermal conducting plate disposed on the upper casing, and a thermal generating device disposed between the thermal conducting plate and the bottom casing,
   a plurality of sockets disposed on the bottom casing,
   a plurality of pedestals inserted in the sockets, each of the pedestals having an upper pillar and an oblong hole formed in the upper pillar,
   a plurality of elastic elements each enclosing the respective upper pillar,
   a flat insulation plate disposed on the elastic elements,
   the flat insulation plate having a plurality of through holes each matching the respective oblong hole of the upper pillar,
   the thermal generating device having a dish disposed on the flat insulation plate, a corrugated insulation plate disposed on the dish, and a plurality of heaters disposed on a bottom of the thermal conducting plate, a plurality of bottom posts disposed on a bottom of the dish, each of the bottom posts inserted through the respective through hole of the flat insulation plate and inserted in the respective oblong hole of the upper pillar, an electric circuit board disposed in the bottom casing, an electric control board disposed on the upper casing, and a plurality of wires connected to the electric circuit board and the heaters.

2. A heating device comprises:

a bottom casing, an upper casing engaging with the bottom casing, a thermal conducting plate disposed on the upper casing, a thermal generating device disposed between the thermal conducting plate and the bottom casing, a plurality of sockets disposed on the bottom casing, a plurality of pedestals inserted in the sockets, each of the pedestals having an upper pillar and an oblong hole formed in the upper pillar, a plurality of elastic elements each enclosing the respective upper pillar, a flat insulation plate disposed on the elastic elements, the flat insulation plate having a plurality of through holes each matching the respective oblong hole of the upper pillar, the thermal generating device having a dish disposed on the flat insulation plate, a corrugated insulation plate disposed on the dish, and a plurality of heaters disposed on a bottom of the thermal conducting plate, a plurality of bottom posts disposed on a bottom of the dish, each of the bottom posts inserted through the respective through hole of the flat insulation plate and inserted in the respective oblong hole of the upper pillar, an electric circuit board disposed in the bottom casing, an electric control board disposed on the upper casing, and a plurality of wires connected to the electric circuit board and the heaters.

\* \* \* \* \*